Sept. 26, 1967 W. H. EDMUNDS 3,344,317
CIRCUIT BREAKER USE LIMITING MEANS
Filed Dec. 8, 1965
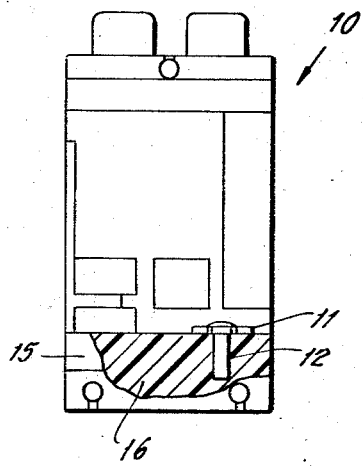
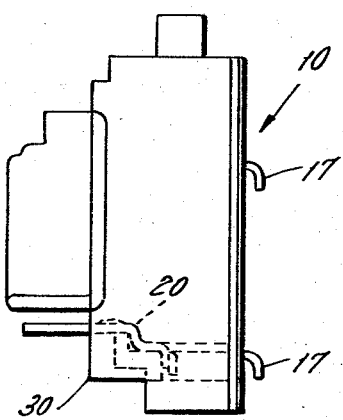
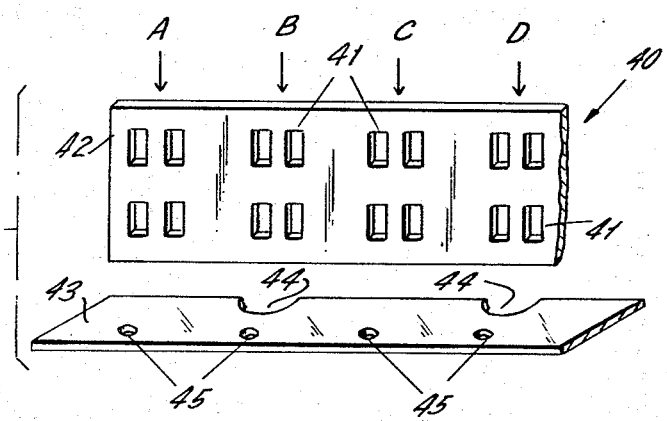
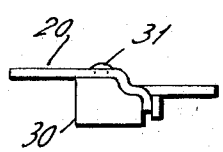
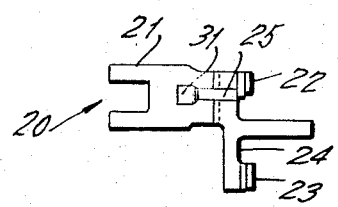
INVENTOR.
WILLIAM HAROLD EDMUNDS
BY
OSTROLENK, FABER, GERB & SOFFEN
ATTORNEYS

United States Patent Office 3,344,317
Patented Sept. 26, 1967

3,344,317
CIRCUIT BREAKER USE LIMITING MEANS
William Harold Edmunds, Bloomfield Hills, Mich., assignor to I-T-E Circuit Breaker Company, Philadelphia, Pa., a corporation of Pennsylvania
Filed Dec. 8, 1965, Ser. No. 512,405
6 Claims. (Cl. 317—119)

ABSTRACT OF THE DISCLOSURE

Circuit breaker use limiting means comprising a projection extending from the casing of a circuit breaker, which projection is secured to the line terminal of the circuit breaker, and which projection abuts the bus bar to which the line terminal would be connected, thereby keeping the line terminal from being connected to the bus bar; the bus bar having notches at predetermined positions, which notches receive the projection and thereby permit the line terminal to be connected to the bus bar; the projection being so connected with the line terminal that removal of the projection from the circuit breaker casing removes the line terminal from the circuit breaker and may also remove a portion of the circuit breaker casing, thereby permanently disabling the circuit breaker.

---

This invention relates to a circuit breaker use limiting means and more particularly to a tamper-proof means for preventing the mounting of circuit breakers in undesired panelboard locations.

Circuit breakers rated for a predetermined load current, for instance, 20 amperes, having been manufactured with standard external casing dimensions. Recent engineering and manufacturing techniques have permitted two circuit breakers, each having the same predetermined load current rating, to be manufactured with this standard casing dimension. Thus, for example, there is presently available both a single 20 ampere circuit breaker in a casing of predetermined dimensions and two 20 ampere circuit breakers within a casing of the same dimensions.

The interchangeability of multiple branch breakers, like the one shown in U.S. Patent No. 3,075,058, issued to Platz, et al., and assigned to the instant assignee, for single branch circuit breakers permits circuit breaker panelboards to have a large number of branch circuits. Overloading of panelboards has often resulted.

It is desirable and necessary for safety to limit the number of branch circuits for any individual circuit breaker panelboard. Since voluntary limiting in the field cannot be relied upon, means are needed to limit the number of multiple branch circuit breakers that can be connected to any panelboard. The means must also be tamper-proof to prevent an installer in the field from removing it and defeating its function.

Applicant has provided a means which will restrict the use of multiple branch circuit breakers and if an attempt is made to remove the means and defeat its function, the line terminal will be pulled out and the breaker casing will be destroyed.

The present invention consists of a use limiting means, the operative part of which is a member that is secured to the line terminal of a multiple branch circuit breaker. The use limiting means projects out of the breaker casing and abuts a panelboard bus bar preventing installation of the circuit breaker if the multiple branch circuit breaker is inserted in the wrong location. At panelboard positions where it is felt that a multiple branch breaker could be installable, a notch is cut in the bus bar. The projecting member or use limiting means passes through the notch, permitting the line terminal to contact the bus bar. This allows proper circuit breaker installation.

The projecting member is secured to, or is part of, the line terminal. If an installer attempts to remove the member, the line terminal is pulled out and the breaker casing is destroyed. This makes the breaker incapable of being electrically connected into a circuit.

Circuit breakers having use limiting means designed according to the instant invention can be mounted only on a panel board adapted to receive projecting members such as the applicant has disclosed. Applicant has, therefore, invented a novel circuit breaker panel board similar to the one shown in U.S. Patent No. 2,880,263, issued to Herrmann, et al., and assigned to the assignee of the instant invention, for use in conjunction with his novel circuit breakers. The panel board bus bars each have notches located where it is desirable to position multiple branch circuit breakers. The projecting members pass through the notches and installation is completed. When an installer in the field tries to position applicant's circuit breakers at locations on his panel board where it is not desired that multiple branch circuit breakers be installable, the projecting members will abut the unnotched portion of the bus bar preventing installation.

Accordingly, it is a primary object of the present invention to provide a multiple branch circuit breaker having a use limiting means which prevents installation of the breaker in an undesired position on a panel board.

It is a second object of the present invention to provide a circuit breaker having a use limiting means which if tampered with, will render the circuit breaker incapable of being electrically connected into a circuit.

It is another object of the present invention to provide a circuit breaker having a use limiting means which when removed in the field, removes the line terminal of the circuit breaker, thereby rendering the breaker incapable of being electrically connected into a circuit.

It is a further object of the present invention to provide a circuit breaker having a use limiting means, which when removed, will both tear the circuit breaker casing and will remove the line terminal thereby rendering the circuit breaker incapable of being electrically connected into a location in the panel board.

It is another object of the instant invention to provide a circuit breaker panel board having bus bars adapted to receive the circuit breakers designed in accordance with the foregoing objects.

These and other objects of the present invention will become apparent after reading the following description of the accompanying drawings in which:

FIGURE 1 is a front elevation of a multiple branch circuit breaker adapted in accordance with the teachings of the present invention.

FIGURE 2 is a side elevation of the circuit breaker in FIGURE 1.

FIGURE 3 is a side view of the use limiting means shown in FIGURE 2.

FIGURE 4 is a plan view of the use limiting means shown in FIGURE 3.

FIGURE 5 is a perspective of a portion of a panel board adapted in accordance with the teachings of the instant invention.

Referring to FIGURES 1-4 which illustrate the use limiting means of the present invention, double branch circuit breaker 10 has apertures 11 and 12 through its casing. The apertures might form a T-shape or might meet or approach one another at any other angle. Circuit breaker line terminal 20 extends out of the casing of breaker 10 through aperture 11. The use limiting means is projecting member 30 which passes through aperture 12 in the casing.

Line terminal 20 is similar to the line terminal 1 of U.S. Patent No. 3,075,058, issued to Platz, et al., and assigned to the assignee of the instant invention. It has U21 or another suitable terminal mount. It has two stationary contacts 22 and 23. Stationary contact 23 is electrically connected to terminal 20 by extension 24. When the line terminal 20 is installed, extension 24 engages the casing of breaker 10 inside portion 15 of the casing. Line terminal 20 has aperture 25 therethrough for receiving the projecting member 30. Aperture 25 may be otherwise shaped, e.g., as a horseshoe, to receive a projecting member configured, e.g., as a horseshoe. Alternatively, the projecting member 30 may abuttingly engage the line terminal 20 obviating the need for aperture 25.

Projecting member 30 has extension 31 which passes through and beyond aperture 25. When extension 31 is peened over, it secures projecting member 30 to line terminal 20. Other means for affixing projecting member 30 to line terminal can be used. Line terminal 20 and projecting member 30 might be manufactured as an integral unit.

Note that when the structure illustrated in FIGURE 3 is installed as shown in FIGURE 2, the extension 31 is within the casing of breaker 10 so that an installer in the field would not be able to separate line terminal 20 from projecting member 30 without damaging the breaker casing.

Projecting member 30 may be metallic in composition. It will not short a circuit breaker if it is made of metal since it only will contact the similarly electrically energized line terminal and panel board bus bar.

If, in the field, an installer attempts to remove the projecting member 30 to facilitate installation of the breaker 10 in an incorrect position, the line terminal 20 will also be torn out of the breaker rendering the breaker incapable of being electrically connected into a circuit. This distinguishes the present projecting member from the extension 52 of the breaker shown in U.S. Patent No. 3,120,629, issued to Davis and assigned to the assignee of the instant invention, for in Davis, if the extension is removed, the line terminal can still be electrically connected into a circuit. Furthermore, the line terminal extension 24 will engage the casing portion 15 and will tear out the cross hatched portion 16 of casing portion 15, permanently damaging the breaker and precluding installation of a new line terminal.

From the foregoing it can be seen how the use limiting means of the instant invention is protected against tampering.

Refer to FIGURE 5. Circuit breakers adapted with the above described use limiting means may be mounted on panel board 40. The hooks 17 of circuit breaker 10 are inserted through the apertures 41 of the mounting rail 42. The projecting member 30 will prevent the breaker 10 from being inserted at positions A or C on bus bar 43 because the projecting member will abut the bus bar at those positions. If the circuit breaker 10 is inserted at positions B or D, the projecting member will pass through notches 44 permitting the line terminal 20 to come to rest on bus bar 43 to which the line terminal mounts of each breaker are secured by a bolt through threaded apertures 45. The notches 44 must be sufficiently large to permit projecting members 30 having any configurations devised to pass freely through. The notches 44 must be sufficiently small so that the bus bar 43 provides a support for the line terminal 20.

A single branch circuit breaker which does not have the applicant's use limiting means attached below its line terminal may be mounted at positions A, B, C and D, since no projecting member will prevent the line terminal from being positioned against bus bar 43 at positions A or C.

Although there is here described a preferred embodiment of applicant's novel use limiting means and one embodiment of a panel board adapted for use with circuit breakers having such means, many variations and modifications will now be apparent to those skilled in the art and, therefore, applicant prefers to be limited not by the specific disclosure herein, but only by the appending claims.

The embodiments of the invention in which an exclusive privilege or property is claimed are defined as follows:

1. A circuit breaker having a casing, a line terminal, and a use limiting means to prevent installation of said circuit breaker in an improper circuit;

said means constructed and operatively positioned whereby removal of said means to permit installation of said circuit breaker in an improper circuit also removes said line terminal thereby rendering said circuit breaker incapable of being electrically connected into a circuit.

2. The circuit breaker of claim 1, in which said means comprises a member projecting from said casing.

3. The circuit breaker of claim 1, in which said means is secured to said line terminal.

4. The circuit breaker of claim 3, in which said line terminal engages a portion of said casing;

said means comprising a member projecting from said casing;

removal of said projecting member removing said line terminal and tearing off said portion of said casing.

5. The circuit breaker of claim 3, in which said means comprises a member projecting from said casing;

said projecting member is comprised of metal.

6. In combination, the circuit breaker of claim 3 and a panel board;

said panel board comprising a mounting rail and at least one bus bar;

said mounting rail having means for affixing circuit breakers thereto;

said bus bar having at first and second positions means for receiving a circuit breaker line terminal mount;

said bus bar having at said first positions notches shaped so as to permit free by-passage of said use limiting means when said circuit breakers are mounted on said mounting rail, thereby permitting said line terminal mounts to be in contact with said bus bar;

said bus bar having at said second positions abutment portions which prevent the free passage of use limiting means attached to circuit breakers when it is sought to mount said circuit breakers on said mounting bracket.

References Cited

UNITED STATES PATENTS 3,289,049  11/1966  Middendorf _____ 317—119

ROBERT S. MACON, *Primary Examiner.*

ROBERT K. SCHAEFER, *Examiner.*

H. O. JONES, *Assistant Examiner.*